E. M. TINGLEY.
DYNAMO ELECTRIC MACHINE.
APPLICATION FILED NOV. 13, 1905.
945,425.
Patented Jan. 4, 1910.
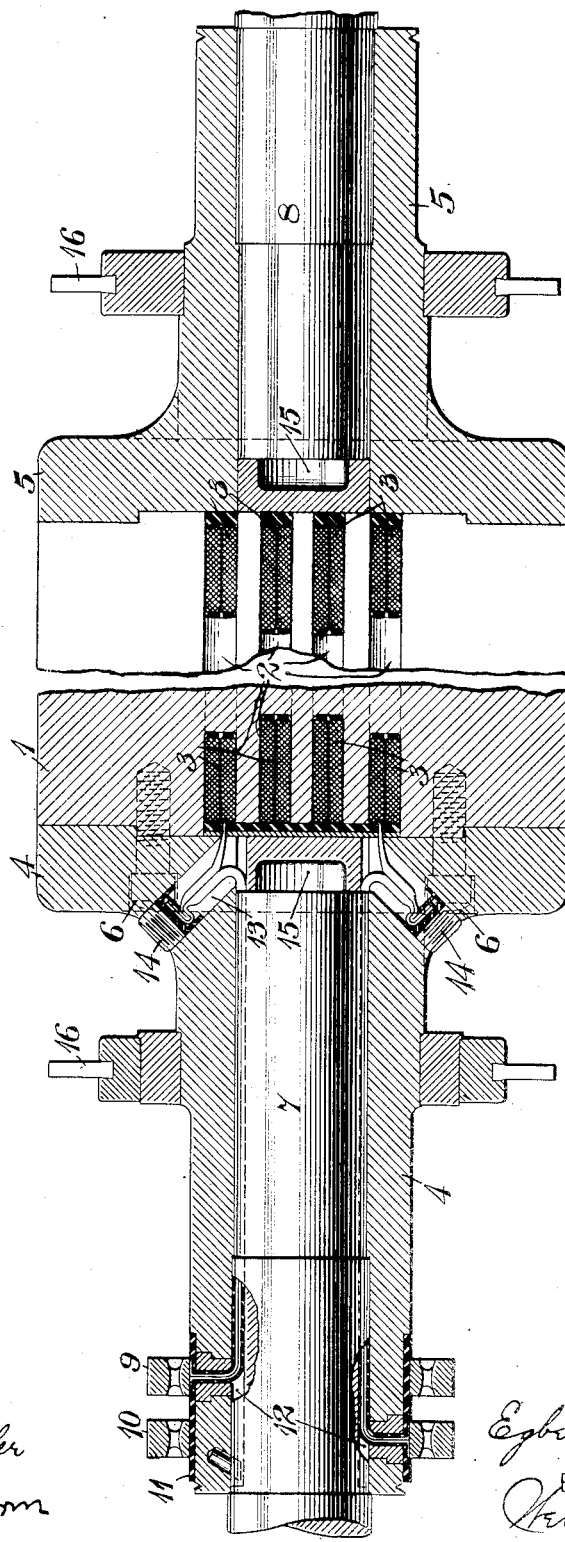
WITNESSES:
Fred. H. Miller
R. R. Dearborn
INVENTOR
Egbert M. Tingley
BY
Wesley J. Carr
ATTORNEY

UNITED STATES PATENT OFFICE.

EGBERT M. TINGLEY, OF PITTSBURG, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

945,425.   Specification of Letters Patent.   Patented Jan. 4, 1910.

Application filed November 13, 1905. Serial No. 287,057.

*To all whom it may concern:*

Be it known that I, EGBERT M. TINGLEY, a citizen of the United States, and a resident of Pittsburg, in the county of Allegheny and State of Pennsylvania, have invented a new and useful Improvement in Dynamo - Electric Machines, of which the following is a specification.

My invention relates to rotatable members of dynamo-electric machines, and has special reference to rotatable field magnets which are adapted for operation at relatively high speeds.

The object of my invention is to provide suitable means for rotatably supporting a member of the class above specified, which shall be simple and effective, without interfering with such distribution of the field magnet winding as will provide a minimum magnetic leakage and which shall permit of a materially reduced outside diameter of the magnetizable core.

Rotating field magnets, as heretofore constructed for operation by steam turbines or similar high speed engines, have been provided with a relatively small number of poles, generally two or four, and have usually comprised substantially cylindrical cores of magnetizable material which surrounded the shafts by which they were driven.

In order to adequately resist the strains to which the above mentioned members were subjected in operation, their shafts were made of large diameter, and their cores were correspondingly reduced in thickness. Such reduction of core dimensions served to weaken the structure mechanically; to lessen the available space for windings and to reduce the amount of material available for magnetic induction. This was especially true in bi-polar machines in which the field magnet windings completely encircled the core and were usually disposed in parallel, longitudinal planes.

A material reduction in the diameter of the rotatable member for a given size of machine may be effected by my invention, in which the encircling slots for the field magnet winding are centrally grouped in parallel, longitudinal planes, suitable supporting means being provided by a pair of similar end couplings which are attached to the ends of the core portion near its outer cylindrical surface and which support shaft sections the axes of rotation of which coincide with that of the core portion. A further advantage of this construction resides in the fact that the field magnet winding may be placed in position in the core slots before the shaft members or end couplings are attached thereto, so that the labor involved is materially reduced.

The single figure of the accompanying drawing is a longitudinal section of a portion of the rotatable member of a dynamo-electric machine that is constructed in accordance with my invention.

Referring to the drawing, a magnetizable and substantially cylindrical core portion 1 is provided with a plurality of encircling slots 2 that are disposed in parallel, longitudinal planes and in which a field magnet winding 3 is located. A pair of similar flanged sleeve-couplings 4 and 5 are attached to the core member 1 by a plurality of bolts 6 and serve to support similar shaft sections 7 and 8, which are so rigidly fixed thereto that their axes of rotation are coincident with that of the core member. By this means the necessity for providing a hole through the center of the core of sufficient diameter to receive the shaft is obviated, and the couplings 4 and 5 may preferably be constructed of non-magnetizable material, such as bronze, thereby minimizing the magnetic leakage from the core.

The coupling 4 is provided with collector rings 9 and 10, which are insulated therefrom and from each other by an insulating bushing 11 and are connected to the field winding 3 by means of insulated leads which are disposed in suitable grooves 12 in the shaft portion 7.

The connections between the winding conductors and the leads are accessible through openings 13, in the coupling 4, that are provided with insulating wedges and are closed by cap screws 14.

Spacing blocks 15 of relatively soft material are preferably interposed between ends of the shaft sections and the core body and air-propelling vanes 16 may advantageously be mounted upon the coupling for the purpose of ventilation.

The shaft sections 7 and 8 may be integral with the couplings 4 and 5, if desired, and I desire that variations in size, form and arrangement of details which obtain similar results shall be included within the scope of my invention.

I claim as my invention:

1. A rotatable member for dynamo-electric machines, comprising a magnetizable core having an embedded winding, flanged coupling sleeves clamped to the ends of the core, shaft sections the inner ends of which are seated in said coupling sleeves, and blocks interposed between the ends of the shaft sections and the core.

2. A rotatable member for dynamo-electric machines, comprising a magnetizable core having an embedded winding, flanged coupling sleeves clamped to the ends of the core, shaft sections the inner ends of which are seated in said coupling sleeves, and soft metal blocks interposed between the ends of the shaft sections and the core.

3. A rotatable member for dynamo-electric machines, comprising a magnetizable core having a magnetizing winding disposed in centrally located parallel and longitudinal planes, flanged coupling sleeves of non-magnetizable material clamped to the ends of the core, shaft sections the inner ends of which are seated in said coupling sleeves, and soft metal blocks interposed between the ends of the shaft sections and the core.

In testimony whereof, I have hereunto subscribed my name this 8th day of November, 1905.

EGBERT M. TINGLEY.

Witnesses:
H. S. DE LANCIE,
BIRNEY HINES.